United States Patent Office 2,893,991
Patented July 7, 1959

2,893,991

NEW HYDROXY-QUINONES AND PROCESS FOR PREPARING SAME

Adrian Marxer, Basel, Switzerland, assignor to Ciba Pharmaceutical Products Inc., Summit, N.J.

No Drawing. Application November 29, 1957
Serial No. 699,463

Claims priority, application Switzerland
December 21, 1956

9 Claims. (Cl. 260—239)

This invention relates to new 2:5 bis-ethylene-imino-p-benzoquinones. More particularly the invention concerns 2:5-bis-ethylene-imino-3:6-dihydroxy - p - benzoquinones and their metal salts, especially those of the alkali and alkaline earth metals, such as sodium, calcium or magnesium. The ethylene-imino groups may be unsubstituted or substituted, e.g. C-alkylated by a lower alkyl radical, preferably by a methyl group.

The new benzoquinone compounds are active against amoebae, for example against *Entamoeba histolytica*, and also against bacteria. They can be used as medicments for the treatment of diseases caused by amoebae. Of especially high activity is the 2:5-bis-ethylene-imino-3:6-dihydroxy-p-benzoquinone of the formula

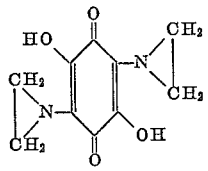

and its salts. These compounds therefore represent a specific and preferred embodiment of the invention.

A further object of the invention is a process whereby the new compounds are obtained when a 2:5-bis-ethylene-imino-3:6-bis - acetylamino or propionylamino-p-benzoquinone is treated with an alkali hydroxide in aqueous solution and, when desired, the 2:5-bis-ethylene-imino-3:6-dihydroxy-p-benzoquinone liberated from the resulting alkali metal salt.

The starting materials can be prepared by the process described in my copending application Serial No. 622,752, filed November 19, 1956, now U.S. Patent No. 2,802,001.

The quinones of this invention can be used as medicaments especially in diseases caused by amoebae, for example in the form of pharmaceutical preparations. These latter contain the specified compounds in admixture with a pharmaceutical organic, or inorganic carrier material suitable for enteral, parenteral or local administration. For this purpose such substances are used as do not react with the new compounds, for example gelatine, lactose, water, starch, magnesium stearate, talc, vegetable oils, benzyl alcohols, gums, polyalkylene glycols, petroleum jelly, cholesterol or other known medicament carriers. The pharmaceutical preparations can be made up, for example, as tablets, dragees, powders, salves, creams, suppositories or in liquid form as solution, suspensions or emulsions. If desired they are sterilised and/or contain auxiliary substances, such as preserving, stablising, wetting or emulsifying agents. They can also contain in addition other therapeutically valuable substances.

The following examples illustrate the invention:

Example 1

30.4 grams of 2:5 - bis-ethylene-imino-3:6-bis-acetylamino-p-benzoquinone are suspended in 800 cc. of distilled water. To this, 200 cc. of N-caustic soda solution are added dropwise with stirring. After about 2 hours a clear violet solution is obtained. This contains the di-sodium salt of 2:5-bis-ethylene-imino-3:6-dihydroxy-p-benzoquinone.

After evaporating under reduced pressure to one half the volume and cooling the solution in an ice box, red-violet crystals of the said sodium salt are obtained, which are isolated by filtration with suction, washed with alcohol and dried. This salt has the formula

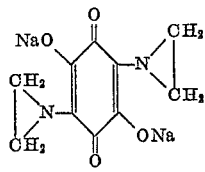

and is of good solubility in water. For pharmacological purposes, the resulting solution can also be used directly.

By the use of 200 cc. of N-caustic potash solution, instead of caustic soda solution, the di-potassium salt is obtained.

The abovementioned solution of the di-sodium salt of 2:5-bis-ethylene-imino-3:6-dihydroxy-benzoquinone can also be treated with half its volume of 40% sodium acetate solution. The resulting red-violet, micro-crystalline precipitate is filtered with suction and washed with a little 50% alcohol. It consists of the crystalline di-sodium salt.

In a similar manner, the precipitation of the sodium salt can be carried out with saturated common salt solution.

When instead of common salt solution concentrated calcium chloride solution is used, the calcium salt is obtained, first in the form of a jelly which soon forms fine crystals. In a similar manner, with concentrated magnesium chloride solution, a jelly is obtained which is soon converted into small crystals of the magnesium salt.

Example 2

33.2 grams of 2:5-bis-ethylene-imino-3:6 - bis - propionylamino-p-benzoquinone are suspended in 800 cc. of distilled water, whereupon, with stirring, 200 cc. of N-caustic soda solution are added dropwise. The clear, violet solution of the sodium salt of 2:5-bis-ethylene-imino-3:6-dihydroxy-p-benzoquinone, obtained after a short time, is either used directly or converted, as described in Example 1, into the crystalline sodium salt.

For the isolation of 2:5 - bis-ethylene-imino-3:6-di-hydroxy-p-benzoquinone from the above salts, for example a solution of the sodium salt can be treated with an equal volume of saturated ammonium chloride solution. After some time there separate from the resulting solution red crystals, which after isolation and drying soften at 203–206° C. without melting.

Example 3

33.2 grams of 2:5-bis-(C-methyl-ethylene-imino)-3:6-bis-acetamino-p-benzoquinone are suspended in 800 cc. of distilled water. 200 cc. of N-caustic soda solution are then added dropwise with stirring. The clear solution, obtained after a short time, contains the di-sodium salt of 2:5-bis-(C-methyl-ethylene-imino)-3:6-dihydroxy-p-benzoquinone, which can be isolated in crystalline form by the methods of Examples 1 and 2.

What is claimed is:

1. A member selected from the group consisting of 2,5-bis-ethyleneimino-3,6-dihydroxy - para - benzoquinones and alkali metal and alkaline earth metal salts thereof.

2. 2,5-bis-ethyleneimino - 3,6 - dihydroxy-para-benzoquinone.

3. The alkali metal salts of 2,5-bis-ethyleneimino-3,6-dihydroxy-para-benzoquinones.

4. The alkaline earth metal salts of 2,5-bis-ethylene-imino-3,6-dihydroxy-para-benzoquinones.

5. The sodium salt of 2,5 - bis-ethyleneimino-3,6-dihydroxy-para-benzoquinone.

6. 2,5-bis-C-methyl-ethyleneimino - 3,6 - dihydroxy-para-benzoquinone.

7. The alkali metal salts of 2,5-bis-C-methyl-ethylene-imino-3,6-dihydroxy-para-benzoquinone.

8. The alkaline earth metal salts of 2,5-bis-C-methyl-ethylene-imino-3,6-dihydroxy-para-benzoquinone.

9. The sodium salt of 2,5-bis-C-methyl-ethylene-imino-3,6-dihydroxy-para-benzoquinone.

References Cited in the file of this patent

UNITED STATES PATENTS

| | | |
|---|---|---|
| 2,770,617 | Marxer | Nov. 13, 1956 |
| 2,833,760 | Marxer | May 6, 1958 |

OTHER REFERENCES

Gauss: Angewandte Chemie, vol. 67, p. 228 (1955).